United States Patent
Schlummer et al.

(10) Patent No.: US 10,857,715 B2
(45) Date of Patent: Dec. 8, 2020

(54) MIXER STRUCTURE FOR A FILM DIE AND A FILM DIE

(71) Applicant: Promix Solutions AG, Winterthur (CH)

(72) Inventors: Christian Schlummer, Winterthur (CH); Frank van Lück, Willich (DE); Rolf Heusser, Winterthur (CH)

(73) Assignee: Promix Solutions AG, Winterthur (CH)

( * ) Notice: Subject to any disclaimer, the term of this patent is extended or adjusted under 35 U.S.C. 154(b) by 394 days.

(21) Appl. No.: 15/681,304

(22) Filed: Aug. 18, 2017

(65) Prior Publication Data

US 2018/0056571 A1 Mar. 1, 2018

(30) Foreign Application Priority Data

Aug. 24, 2016 (EP) ..................................... 16185549
Aug. 24, 2016 (EP) ..................................... 16185550

(51) Int. Cl.
*B29C 48/305* (2019.01)
*B29C 48/36* (2019.01)
(Continued)

(52) U.S. Cl.
CPC .......... *B29C 48/362* (2019.02); *B01F 5/0618* (2013.01); *B29C 48/08* (2019.02); *B29C 48/305* (2019.02); *B29C 48/307* (2019.02); *B29C 48/363* (2019.02); *B29C 48/705* (2019.02); *B01F 2005/0639* (2013.01);
(Continued)

(58) Field of Classification Search
CPC ...... B01F 5/0653; B01F 5/0651; B01F 5/061; B29C 48/305; B29C 48/30; B29C 48/362; B29C 48/363; B29C 48/10; B29C 48/705; B29C 48/307; B29C 48/304
See application file for complete search history.

(56) References Cited

U.S. PATENT DOCUMENTS 4,049,241 A 9/1977 Taniguchi
4,454,087 A 6/1984 Hayashi et al.
(Continued)

FOREIGN PATENT DOCUMENTS

CH 678284 A5 8/1991
DE 2534724 A1 2/1977
(Continued)

OTHER PUBLICATIONS

European Search Report received in EP17186790, dated Jan. 9, 2018, 4 pages.
(Continued)

*Primary Examiner* — Xiao S Zhao
*Assistant Examiner* — Ninh V Le
(74) *Attorney, Agent, or Firm* — Hard IP LLC (57) ABSTRACT

A mixer structure for a film die for a polymer melt includes multiple web elements. The web elements include a first web element and a second web element. The first web element and the second web element include at least an end, which is connected to a base. A film die includes a first tool element, a second tool element, and a flow channel for the polymer melt extending between the first tool element and the second tool element. The mixer structure is arranged in the flow channel. The mixer structure is held in at least one of the tool elements by a holding element.

9 Claims, 5 Drawing Sheets

(51) Int. Cl.
    *B01F 5/06*     (2006.01)
    *B29C 48/08*     (2019.01)
    *B29C 48/70*     (2019.01)
    *B29C 48/07*     (2019.01)
    *B29C 48/12*     (2019.01)
    *B29C 48/17*     (2019.01)

(52) U.S. Cl.
    CPC .............. *B29C 48/07* (2019.02); *B29C 48/12* (2019.02); *B29C 48/175* (2019.02)

(56) References Cited

U.S. PATENT DOCUMENTS

| | | | | |
|---|---|---|---|---|
| 4,892,473 | A * | 1/1990 | Elia | B29C 48/254 |
| | | | | 425/197 |
| 5,176,925 | A | 1/1993 | Weber et al. | |
| 5,435,961 | A | 7/1995 | Micciche | |
| 5,564,827 | A * | 10/1996 | Signer | B29C 48/362 |
| | | | | 366/336 |
| 6,394,644 | B1 * | 5/2002 | Streiff | B01F 5/0613 |
| | | | | 366/337 |
| 6,550,960 | B2 * | 4/2003 | Catalfamo | B01F 5/061 |
| | | | | 366/337 |
| 6,743,006 | B2 * | 6/2004 | Jaffer | B29C 48/30 |
| | | | | 425/132 |
| 2003/0091677 | A1 | 5/2003 | Jaffer et al. | |
| 2004/0114461 | A1 | 6/2004 | Fuglister | |
| 2015/0087733 | A1 | 3/2015 | Heusser | |

FOREIGN PATENT DOCUMENTS

| | | | |
|---|---|---|---|
| EP | 0154013 | A2 | 9/1985 |
| EP | 0287861 | A1 | 10/1988 |
| EP | 0856353 | A1 | 8/1998 |
| EP | 1543938 | A1 | 6/2005 |
| EP | 1767332 | A1 * | 3/2007 |
| EP | 2111917 | A1 * | 10/2009 |
| JP | H07-251435 | A | 10/1995 |
| WO | WO82/02004 | * | 6/1982 |
| WO | 2006024181 | A1 | 3/2006 |

OTHER PUBLICATIONS

European Search Report for EP 16185549.9 dated Feb. 10, 2017, 7 pages.
European Search Report for EP 16185550.7 dated Feb. 10, 2017, 7 pages.

* cited by examiner

MIXER STRUCTURE FOR A FILM DIE AND A FILM DIE

RELATED APPLICATIONS

This application claims the benefit of European patent application no. EP 16185549.9, filed Aug. 24, 2016, and European patent application no. EP 16185550.7, filed Aug. 24, 2016, the contents of both of which are hereby incorporated by reference in their entirety.

TECHNICAL FIELD

The invention relates to a mixer structure for a film die. The invention relates also to a film die including a mixer structure. Such a film die is commonly used in an extrusion process for manufacturing foils or films. These films can have a layer thickness of some micrometers. Film dies can also be used to manufacture plastic sheets with layer thicknesses of some centimeters.

DESCRIPTION OF RELATED ART

Film dies are used to transform a polymer melt of a circular flow cross-section into a rectangular flow cross-section of a large width and a small thickness. The term "a large width" thereby means a width of at least five times the diameter of the circular flow cross-section. Commonly, so called hanger manifolds are employed and island arrays are formed as flow resistance to distribute the polymer melt as homogeneously as possible and to keep the flow velocity in the outlet section of the film die substantially constant. The section of the film die which enables an increase of the flow cross-section to the cross-section of outlet opening is followed by a section in which the width of the flow channel remains constant until the outlet opening. The manufacture of extrudates of high quality with small layer thickness tolerances requires a substantially constant flow velocity, temperature distribution and melt homogeneity across the entire cross-section of the outlet opening of the film die. The configuration of the geometry of the flow channel of the film die is therefore generally optimized for a single material, a single temperature, a single flow rate. The film die can be ideally configured optimally only for one single operation point. If the flow rate, the temperature, the viscosity or the material processed change, ideally also the geometry of the flow channel shall be adapted what is impossible during operation as the film die can't be exchanged during operation.

In particular for the manufacture of foamed films or plastic sheets with a layer thickness of some millimeters, it is difficult to obtain a sufficiently high pressure drop across the film die as only an insufficient pressure can be generated due to the fact that the nozzle edges arranged at the outlet opening of the film die form a large gap. In addition, the outlet opening widens depending on the pressure drop, which may cause problems in particular for film dies of a large width. Sometimes flow obstructing bars are used to modify the flow resistance. Flow obstructing bars can form an additional barrier for the polymer melt to influence the flow across the flow cross-section. In particular, the flow cross section for some sections of the flow channel can be changed if the flow obstructing bar consists of a plurality of segments which can be adjusted such that the thickness of the flow channel can be changed for each segment. In addition, the pressure drop upstream of the outlet opening can be increased. A disadvantage of flow obstructing bars results from the disturbance of the flow as they generate uneven flow velocities as well as temperature differences. In addition, the residence time distribution of polymer compounds in the melt in the section of the flow obstructing bars is broad, which can lead to deposits and long cleaning cycles if materials and colors are changed.

Typically, a film die is heated with electrical heating elements or with oil. The heat supply leads to temperature inhomogeneities in the melt, which leads to variable film or sheet layer thicknesses and to foam structures of inferior quality for foamed extrudates. If the temperature distribution and flow velocity are influenced by a flow obstructing bar, additional problems can arise, e.g. streaks can form in the extrudate.

It is known from document U.S. Pat. No. 5,176,925 A or US2003/0091677 A1 to equip the film die with static mixer structures to equalize the flow and to homogenize the polymer melt, which can result in an improvement of the extrudate quality.

According to document U.S. Pat. No. 5,176,925 A, a mixer structure is proposed consisting of bolts on a support plate with integrated channel geometry extending over a major portion of the enlargement portion of the film die, whereby the enlargement portion is arranged between the inlet cross-section and the outlet cross-section of the film die. This concept allows the film die to be opened for cleaning, however the assembly and disassembly of the large support plate is cumbersome and therefore its replacement rather expensive. The simple mixer structure consisting of bolts arranged vertically with respect to the direction of flow doesn't allow an effective homogenization of the polymer melt, such that streaks can form in the extrudate. The protruding bolts also prevent a polishing of the inner film die channel geometry, which is considered advantageous in a lot of extrusion applications to prevent deposits of the extrudate.

In document US 2003/0091677 A1 it is proposed to mount bars or tubes arranged in an angle with respect to the direction of fluid flow. Such structures show an improved mixing effect. US2015/087733 A1 shows a mixer structure, which is arranged upstream of a discharge nozzle of any arbitrary configuration. The web elements of US2015/087733 A1 are welded to the inner wall of the cladding element or are configured as a monolithic piece.

EP0856353 A1 shows a static mixing device in a tube, which has cylinder-shaped web elements traversing the inner space formed by the tube which are fixedly attached to the inner wall of the tube. A similar configuration is disclosed also in the document JPH07 251435 A.

None of these documents disclose how these structures should be integrated into a film die to ensure a simple cleaning and a simple assembly or replacement of the mixer structure. The tubes must be connected to the tool half sections in particular if a heat exchange fluid flows through the tubes, which makes it impossible to open the tool and the cleaning thereof.

In the document U.S. Pat. No. 4,454,087 A1 a static mixer in a tube is disclosed, which is supported in the flow passage by a support element. This support element is arranged downstream of the static mixer and has the disadvantage that it extends into the flow passage, which means that it disturbs the flow on one hand and increases the overall length of the static mixer in the flow passage on the other hand.

The document DE2534724 A1 shows a flat film extrusion die tool with supply channels for colors, which are added at arbitrary locations normally to the direction of fluid flow of the base color mass across the width and thickness of this base color mass in the inlet zone of the flat film extrusion die tool. These supply channels are configured to supply colors into a thermoplastic polymer mass and are formed as tube stubs, which contain one or more color channels. The tube stubs extend into the thermoplastic polymer mass, such that the colors are not only added to the surface of the thermoplastic polymer mass, but to form a pattern across the entire thickness of the thermoplastic polymer mass. In this application, the differently colored stands should be clearly recognizable, that means, no mixture of the color and the thermoplastic polymer mass should occur. For this reason, the color supply channels do not assume the function of a static mixer.

SUMMARY

It is an object of the invention to attach the mixer structure to the film die in such a way that the access and the cleaning of the film die is ensured, a simple assembly or replacement and cleaning of the mixer structure is possible. The placement of the mixer structure in the film die results in the lowermost mixing length and results in high quality extrudates. The term high quality extrudate means a homogeneous mixture of all compounds.

A special use of a film die is the manufacture of foamed films and/or sheets from a polymer melt to which one or more chemical and/or physical blowing agents have been added. The foaming typically occurs in the outlet section of the film die or directly after the discharge of the polymer melt through the outlet opening of the film die. For manufacturing high quality foamed products, high pressure drops in the outlet opening of the film die are required, which can't be reached in particular when processing polymer melts of low viscosities, e.g. for the processing of PET melt or for manufacturing extrudates of 2-20 mm thickness. In addition, maintaining a constant temperature and a constant flow velocity in the outlet opening of the film die is required for a uniform foaming and foamed extrudates of high quality. That means, that high quality foamed extrudates can be manufactured with state of the art film dies only to a limited extent.

It is an object of the invention to manufacture an economical film die to manufacture extrudates of high quality substantially independently of the operating point with narrow layer thickness tolerances, in particular to manufacture foamed extrudates of a very uniform and fine cellular structure.

The solution of the objects of the invention is obtained by a mixer structure according to claim 1 and a film die according to claim 6 or claim 15. Advantageous variants of the mixer structure are subject of dependent claims 2 to 5. Advantageous configurations of the film die are subject of dependent claims 7 to 14 and 15 to 25.

The mixer structure for a film die for a polymer melt comprises a plurality of web elements comprising a first web element and a second web element. The mixer structure is arranged in a flow channel formed by the film die for the polymer melt, whereby the flow channel is configured for the flow of the polymer melt therethrough in a direction of flow in the operating state. The direction of flow is arranged substantially parallel to a longitudinal axis of the flow channel. The longitudinal axis is the shortest connection line in the flow channel between the inlet opening and the outlet opening of the film die. At least one of the first web elements and the second web elements comprise at least an end, which is connected to a base configured to be received in the inner wall of the film die. The base has a width B in the direction of flow which is smaller or the same as the projection length l of at least one of the first and second web elements in the direction of flow. The base is arranged consecutively to at least the end of one of the first or second web elements in a normal direction to the direction of flow, such that the base extends over the end of the first or second web element in the normal direction to the fluid flow. The base surrounds at least a section of at least one of the first and second web elements. At least one of the first web elements or the second web elements is received at least partially in the base. At least one of the first web elements or the second web elements is thus contained at least partially in the base.

The mixer structure according to the invention is assembled in the film die by means of the base of the mixer structure, whereby the base or bases interferes or interfere which at least one of the tool elements or is/are attached to at least one of the tool elements.

The base can be connected to at least one of the first or second tool elements by means of a force-fit, e.g. by a screw connection. The base can comprise a fixing means for connection with a tool element. The distance between the end of the first web element and the end of the second web element can correspond substantially to the width B of the base. These bases have dimensions which are advantageously substantially of similar size as the projection surface of the mixer structure to be assembled. In particular, the projection surfaces of the bases are not larger than 10 times, advantageously not larger than 6 times, in particular not greater than 3 times the projection surface of the mixer structure. According to an embodiment, the mixer structure has a mixer structure projection surface, the base has a base projection surface, whereby the mixer structure projection surface and the base projection surface are arranged normally with respect to the flow channel thickness FH, whereby the base projection surface is not greater than 10 times of the mixer structure projection surface. The mixer structure can be provided with a base only on one side or advantageously on both sides facing the tool elements. According to an embodiment, each of the ends of the first and second web elements is connected to the base. The forces resulting from the pressure drop in the mixer structure can thereby be transferred evenly into the tool elements.

In particular, the base can be arranged consecutively to the end of the first web element and/or the end of the second web element normally with respect to the direction of flow, such that the base is situated outside of the mixer structure, whereby the length of projection l of the mixer structure corresponds to the direction of flow of the projection of the web elements in the direction of the longitudinal axis.

A plurality of first and second web elements can be arranged in a flow channel next to each other, such that they can be reached by the polymer melt substantially contemporaneously. According to an embodiment at least five first and second web elements can be arranged next to each other in the flow channel. The width of the flow channel can correspond to at least five times of the thickness of the flow channel. This embodiment provides an advantageous configuration for the manufacture of extrudates in the shape of sheets. According to an embodiment the width of the flow channel can correspond to at least ten times the thickness of the flow channel. In particular, at least 10 first and second web elements can be arranged next to each other in the flow channel. Next to each other means that the web elements are reached substantially contemporaneously by the polymer melt. This embodiment provides an advantageous configuration for the manufacture of extrudates in the shape of thin sheets or foils.

The film die comprises a first tool element, a second tool element, a flow channel for the polymer melt extending between the first tool element and the second tool element, whereby a mixer structure is arranged in the flow channel, which comprises a first web element and a second web element. The mixer structure is held in at least one of the tool elements by at least one holding element. The length of projection l of the mixer structure is greater or substantially equal to the width B of the holding element. The first web element can be arranged in an angle to the second web element, whereby the angle between the first and second web element can be between 25 degrees and 75 degrees.

The first web element and the second web element can comprise at least a coupling element for forming the mixer structure. The coupling element can comprise an element from the group of welded connections, soldered connections, threaded connections, riveted connections, tube elements, bar elements, clamps or cast traverses.

According to an embodiment, the base is connectable to the tool element by a fixing means, for instance threaded. The fixing means can be configured to form a releasable connection, for instance, the base can be connected to the tool element by a threaded connection. The threaded connection can be provided from the exterior, that means from the external side of the tool element. In case of a bilateral threaded connection, the first tool element can be connected to the second tool element by the mixer structure, such that a force can be transmitted by this connection. This variant has the advantage, that a widening under pressure of the film die in case of operation under high pressures can be avoided. The advantage is pronounced in particular for film dies with a very large width and allows for the use of thin-walled tool elements. An adjustment of the nozzle gap for changing pressures is thus not required. The provision of the mixer structure results in the manufacture of film dies for a plurality of films of less complex configuration, which allow for the supply of a plurality of polymer layers to the film die through separate supply channels and to distribute them across the discharge width to obtain an extrudate comprising more than one polymer layer. The mixer structure is placed upstream to the collection of the layers and can be arranged only in a single layer or also in a plurality of layers.

The mixer structure can extend across the entire flow cross-section of the flow channel. The flow cross-section of the flow channel is characterized by the flow channel thickness FH and the flow channel width FB. According to an embodiment the mixer structure extends over the flow channel width of the film die. The first and second tool element can contain an inlet opening and an outlet opening. The flow channel can be disposed with a flow channel length FL, which extends as shortest connection line from the inlet opening to the outlet opening. The flow channel can have a flow channel thickness FH, which is characterized by the normal distance between the first tool element and the second tool element as well as a flow channel width FB, which is arranged normally to the flow channel thickness FH and the flow channel length FL. The flow channel length FL is thus measured from the inlet opening or the inlet openings of the polymer melt in the flow channel to the outlet opening of the flow channel. The flow of the polymer melt has a direction of flow directed from the inlet opening or the inlet openings to the outlet opening. The flow channel thickness FH can differ at different points of the length of the flow channel FL. The flow channel width FB can differ at different points of the length of the flow channel FL. In particular, the flow channel width FB can be greater at the outlet opening than at the inlet opening.

The mixer structure can be configured as a ribbon. The ribbon can consist of a plurality of web elements, if the mixer structure contains a plurality of web elements. Such a ribbon is advantageously arranged in a right angle with respect to the direction of flow of the polymer melt. At least one of the tool elements can comprise a corresponding recess, for instance a slit. The base can be received in the recess. The base and the recess can be configured as a snug fit.

The mixer structure can contain a ribbon consisting of a plurality of ribbon segments. The use of ribbon segments allows a simple assembly or disassembly and also a simple cleaning of the disassembled mixer structures or their replacement. The cleaning of the mixer structures can be performed in an oven, e.g. under vacuum conditions. Therefore, the cleaning of dismountable mixer structures is advantageous, which are configures e.g. as ribbons and/or ribbon segments. It has been shown that a mixer structure has advantageously an assembly width, which corresponds to less than 10 times, in particular, less than 5 times, preferably less than 2 times of the flow channel thickness FH. The assembly width is measured in a normal plane to the flow channel width FB. The assembly width can correspond substantially to the width B.

A plurality of mixer structures can be arranged parallel to each other. The mixer structures can be arranged parallel to the flow channel width FB. Neighboring mixer structures can have a distance in between. The mixer structures are accordingly arranged behind each other when viewed in the direction of the flow channel length.

The flow channel width FB can increase at least sectionally from the inlet opening to the outlet opening. The flow channel width can be constant in a flow channel section upstream of the outlet opening. The flow channel section with constant flow channel width can comprise up to and including 50% of the flow channel length FL. A mixer structure can be arranged in the flow channel section of constant flow channel width. A mixer structure can be arranged in the enlarging flow channel section. The flow channel section of constant flow channel width is advantageously arranged upstream of the outlet opening.

A mixer structure can be arranged in the enlarging flow channel section. A guide element can be provided in the flow channel for the improved distribution of the polymer melt from the inlet opening to the outlet opening. The guide element can be configured as an island array and/or a flow obstructing bar. A flow obstructing bar can additionally allow a regulation of the pressures and flow rates. An island array can improve the pre-distribution of the polymer melt. The mixer structure can be inserted upstream or downstream of the guide element. The mixer structure can be provided in the section of constant flow channel width, whereby the polymer melt can be pre-distributed by a guide element to the outlet cross-section. The pre-distribution is obtained advantageously by an island array. An island array comprises at least one protrusion arranged in the flow channel which generates a resistance in the direction of flow and thereby pre-distributes the polymer melt to the entire outlet cross-section. It has been shown, that in particular the combination of the island array with a mixer structure results in a substantially process-point independent, uniform flow.

It has been shown, that it is advantageous to provide a mixer structure comprising a first and a second web element for a good mixing effect and for obtaining high quality extrudates. The use of simple bolts, which are positioned normally to the direction of flow as shown e.g. in U.S. Pat. No. 5,176,925A often leads to streaks in the extrudates. It has been shown that in particular a mixer structure is suitable for this purpose, which comprises a plurality of web elements arranged cross-wise with respect to each other.

Surprisingly it has been shown also, that the use of first and second web element between the base and the tool element doesn't lead to deposits and/or streaks in the extrudate. This is related thereto that by making use of the mixer structures according to the invention, a substantially uniform flow velocity over the entire width of the flow channel FB and/or over the entire flow channel thickness FH can be generated. Accordingly, it is also possible to provide a mixer structure close to the outlet opening. In particular, the mixer structure can be provided in the section of the outlet lips. The mixer structure can be arranged less than 10 cm, in particular less than 6 cm, preferably less than 4 cm, particularly preferred less than 2 cm upstream of the outlet opening. The mounting of force-transmitting mixer structures close to the outlet opening is particularly advantageous, as a widening of the tool slit should thereby be prevented.

Even the assembly of the base by means of screws from the inner side to the tool elements is possible as long as the threaded connections are positioned in the section of the mixer structures and are for instance arranged at a distance from the mixer structure of less than three times of the slit opening width, respectively the mixer height.

The outlet opening can comprise an element from the group of slits, adjustable slits, flexible lips, hole plates for the generation of higher pressure gradients.

A blowing agent can be added to the polymer melt for manufacturing a foamable or foamed extrudate. The blowing agent can comprise an element of the group of chemical or physical blowing agents. The foaming process can initiate directly upstream or downstream of the outlet opening. For the manufacture of foams of a fine cell size, it is advantageous to generate high pressure gradients in the section of the outlet opening. A high-pressure gradient corresponds to a pressure difference of 50 to 100 bars. The use of mixer structures close to the outlet opening can increase the pressure difference substantially, which leads to a substantial improvement of the cellular structure and an increase of the proportion of fine cells. It has been shown, that the provision of a mixer structure in the flow channel section of constant flow channel width is most advantageous as no disturbing cross-flows occur anymore.

The mixer structure and the base can be manufactured monolithically by suitable casting processes or additive manufacturing processes. The bases can be manufactured separately according to an embodiment and can be connected for instance by soldering or welding with the mixer structure.

Advantageously, the deviation between the minimal flow velocity and temperature and the maximal flow velocity and temperature by the use of a mixer structure according to one of the preceding embodiments corresponds to not more than 10% of the medium flow velocity or medium temperature of the polymer melt leaving the mixer structure. The extrudate obtained from the polymer melt has in the outlet opening neither an inhomogeneous surface, nor any gaps nor any flow marks, such that a constant high product quality and optionally a precise foamability of the polymer melt can be guaranteed.

It has been shown that the provision of a suitable mixer structure leads to a very homogeneous polymer melt with uniform temperature distribution and uniform flow velocity in particular for a wide range of use independently of the process point, thus independently of flow rate, melt viscosity, melt temperature and polymer composition.

BRIEF DESCRIPTION OF THE DRAWINGS

In the following the inventive device is shown in some embodiments.

Thereby it is shown in.

DETAILED DESCRIPTION

Figure 1:
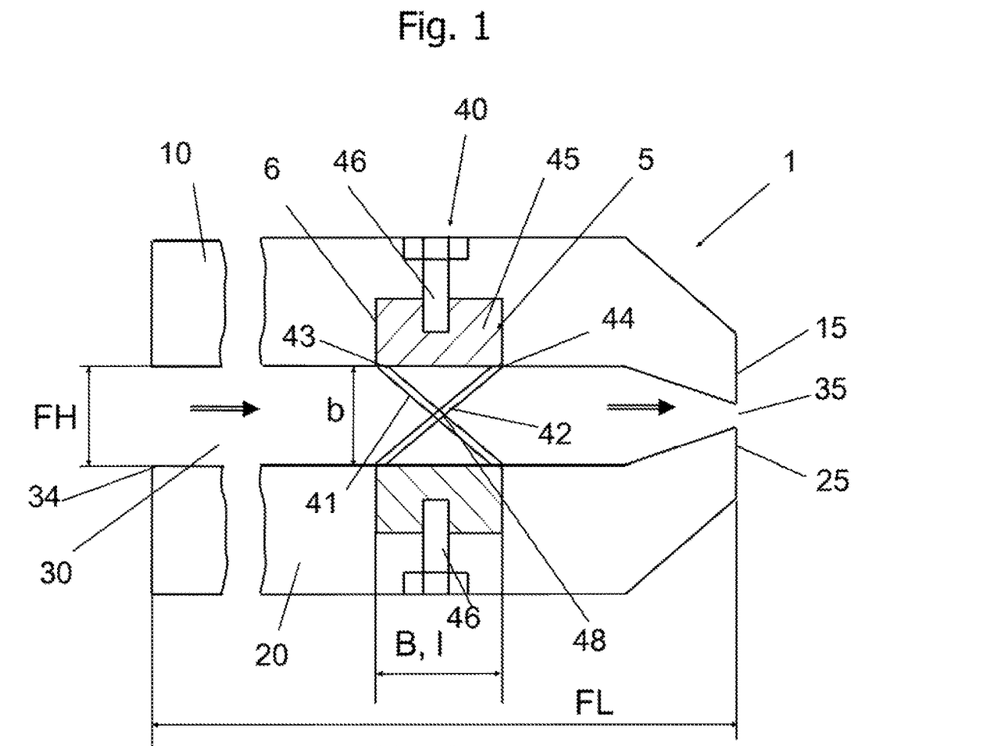
FIG. 1 a section through a film die according to a first embodiment.

A film die 1 according to a first embodiment of the invention contains a first tool element 10, a second tool element 20, a flow channel 30 for a polymer melt extending between the first tool element 10 and the second tool element 20. A mixer structure 40 is arranged in the flow channel 30, which contains at least a first web element 41 and a second web element 42. The first web element 41 is arranged in an angle with respect to the second web element 42, whereby the angle between the first and second web element 41, 42 can be in a range of 25 degrees to 75 degrees. The first web element 41 and the second web element 42 can have at least a coupling element 48 for forming a mixer structure. The coupling element 48 can comprise an element of the group of welded connections, soldered connections, threaded connections, riveted connections, tube elements, bar elements, clamps or cast transitions. The first web element 41 is in particular arranged cross-wise to the second web element 42. The coupling element can be arranged in the crossing point or can form the crossing point of the web elements 41,42. The mixer structure 40 comprises at least a base 45, whereby the first web element 41 and the second web element 42 contain at least an end 43, 44, which is connected to the base 45, whereby the base 45 is connected to at least one of the first or second tool elements 10, 20. In particular, a fixing means 46 can be provided by which the base 45 is releasably attached to one of the first or second tool elements 10, 20. The fixing means 46 can comprise a screw. The fixing means 46 can be manipulated from the exterior of the tool element 10, 20.

The distance between the end 43 of the first web element 41 and the end 44 of the second web element 42 can correspond substantially to the width B of the base 45. Each of the ends 43, 44 of the first and second web elements 41, 42 can be connected to a proper base 45. The mixer structure 40 is retained in at least one of the tool elements 10, 20 by a holding element 5. The holding element 5 according to this embodiment is configured as a recess 6, which is configured to receive the base 45.

The first and second tool element 10, 20 contain an inlet opening 34 and an outlet opening 35. The flow channel 30 is in particular disposed with a flow channel length FL, extends as the shortest possible connection line from the inlet opening 34 and the outlet opening 35. The flow channel 30 can have a flow channel thickness FH, which corresponds to the normal distance between the first tool element 10 and the second tool element 20 as well as a flow channel width FB, which is arranged normally to the flow channel thickness FH and the flow channel length FL. The flow channel width FB is shown in one of FIG. 5, 6, 7.

The flow channel thickness FH in the outlet opening 35 is smaller than in the inlet opening 34. The outlet opening 35 forms a flat die. The inner surfaces of the first and second tool element 10, 20 can be parallel to each other, however, they can also be inclined with respect to each other.

Figure 2:
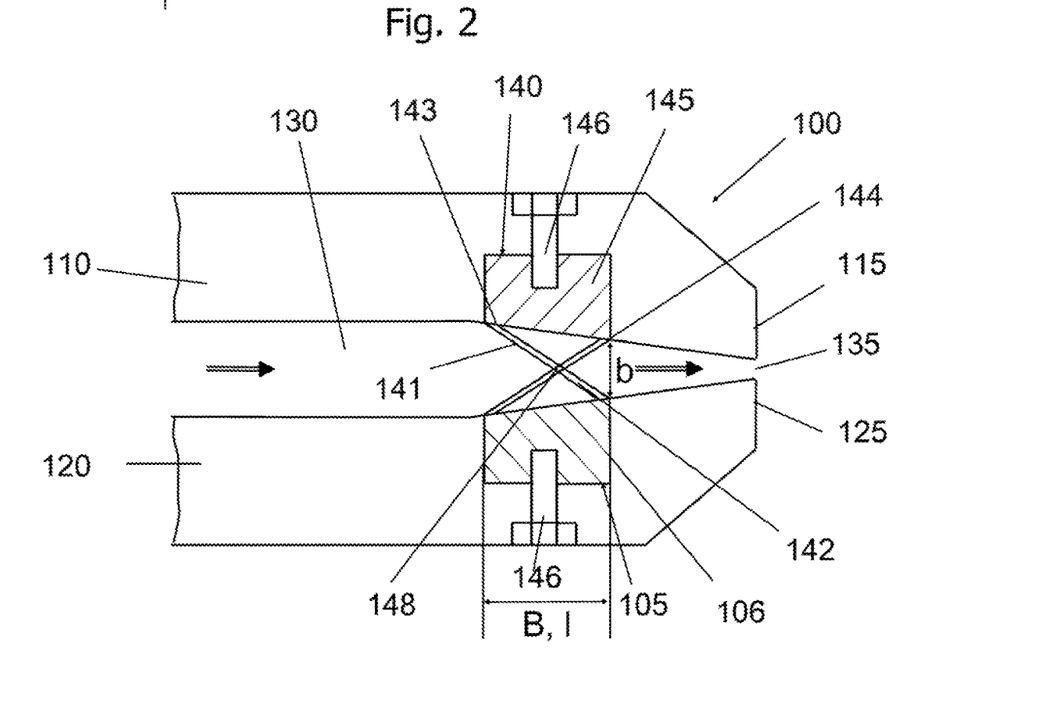
FIG. 2 a section through a film die according to a second embodiment.

FIG. 2 shows a section through a film die 100 according to a second embodiment, which differs from the film die 100 according to FIG. 1 such that the mixer structure 140 is arranged more closely to the outlet opening 135. The film die 100 according to the second embodiment of the invention comprises a first tool element 110, a second tool element 120, a flow channel 130 for a polymer melt extending between the first tool element 110 and the second tool element 120. A mixer structure 140 is arranged in the flow channel 130, which contains at least a first web element 141 and a second web element 142. The first web element 141 is arranged in an angle with respect to the second web element 142, whereby the angle between the first and second web element 141, 142 can be in a range of 25 degrees to 75 degrees. The first web element 141 and the second web element 142 can have at least a coupling element 148 for forming a mixer structure. The first web element 141 is in particular arranged cross-wise to the second web element 142. The coupling element 148 can be arranged in the crossing point or can form the crossing point of the web elements 141,142. The crossing point divides each of the web elements 141, 142 in two web element sections, however the lengths of the legs of the web element sections of each of the web elements 141, 142 have a different length.

The mixer structure 140 has two bases 145. The surfaces of the bases 145 facing the polymer melt have an inclination which corresponds to the inclination of the inner surfaces of the first and second tool elements 110, 120. The first web element 141 and the second web element 142 contain at least an end 143, 144 which is connected to the base 145, whereby the base 145 is fixed at least to one of the first or second tool elements 110, 120. In particular a fixing means 146 can be provided, by which the base 145 is releasably attached to the first or second tool element 110, 120. The fixing means 146 can comprise a screw. The fixing means 146 can be manipulated from the exterior side of the tool element 110, 120.

The distance between the end 143 of the first web element 141 and the end 144 of the second web element 142 can correspond substantially to the width B of the base 145. Each of the ends 143, 144 of the first and second web elements 141, 142 can be connected to one of the bases 145. The mixer structure 140 is received in at least one of the tool elements 110, 120 by a holding element 105. The holding element 105 is according to this embodiment configured as a recess 106 which is configured to receive the base 145.

The first and second tool element 110, 120 comprise an inlet opening 134 and an outlet opening 135. The flow channel 130 has a flow channel length FL, which forms the shortest connection line from the inlet opening 134 to the outlet opening 135. The flow channel has a flow channel thickness FH, which corresponds to the normal distance between the first tool element 110 and the second tool element 120 as well as a flow channel width FB, which is arranged normally to the flow channel thickness FH and the flow channel length FL. The flow channel thickness FB is shown in one of the FIG. 5, 6, 7.

The flow channel thickness FH in the outlet opening 135 is smaller than in the inlet opening 134. The outlet opening 135 forms a flat die. The inner surfaces of the first and second tool element 110, 120 can be parallel to each other, however, they can also be inclined with respect to each other.

Figure 9:
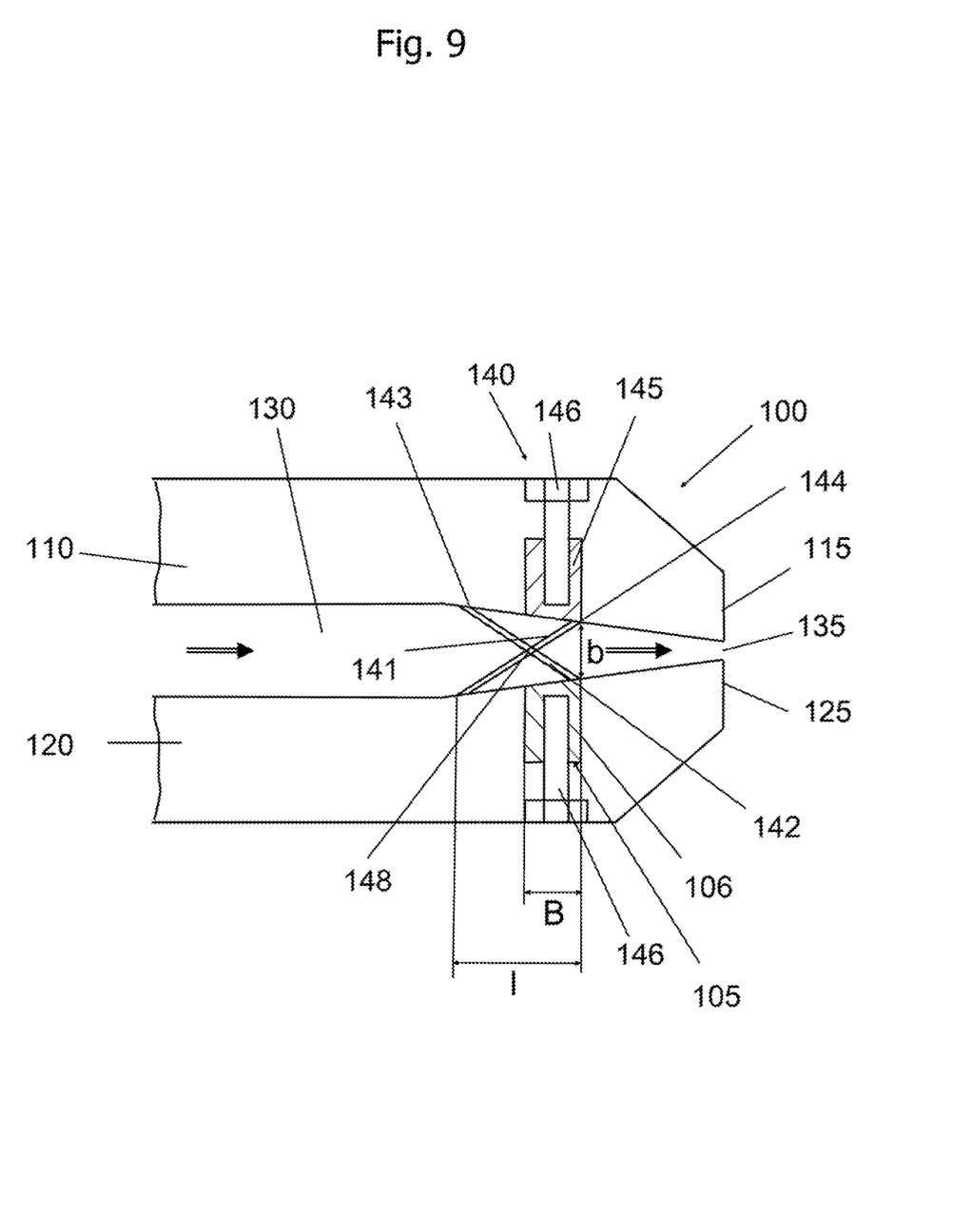
FIG. 9 a variant of FIG. 2.

FIG. 9 shows a variant of FIG. 2 according to which only one end 144 of the first web element 141 and one end 144 of the second web element 142 is connected to the corresponding base 145. Both of the bases 145 are fixed to the first or second tool element 110, 120. In particular a fixing means 146 can be provided, by which the respective base 145 is releasably attached to the first or second tool element 110, 120. The fixing means 146 can comprise a screw. The fixing means 146 can be manipulated from the exterior side of the tool element 110, 120. If the first and second web element are connected to each other by the coupling element 148, one of the bases 145 can be dispensed with.

The distance between the end 143 of the first web element 141 and the end 144 of the second web element 142 in direction of the longitudinal axis is referred to as projection length l. The width B of the base 145 is according to this embodiment smaller than the projection length l. The mixer structure 140 is received in at least one of the tool elements 110, 120 by a holding element 105. The holding element 105 is according to this embodiment configured as a recess 106, which is configured to receive the base 145.

Figure 3:
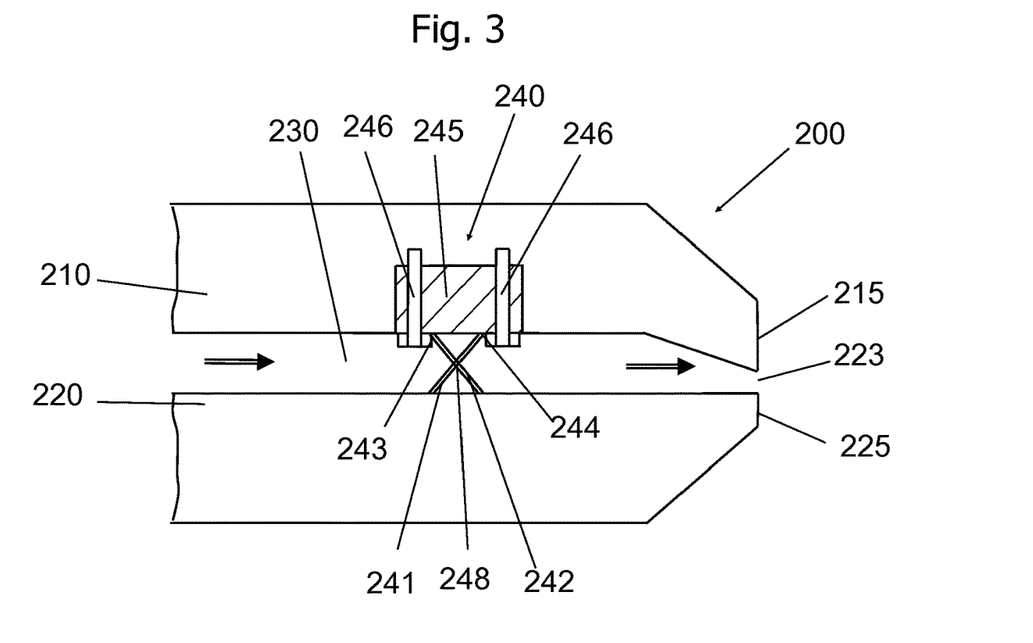
FIG. 3 a section through a film die according to a third embodiment.

FIG. 3 shows a section through a film die 200 according to a third embodiment, which contains a first tool element 210, a second tool element 220, a flow channel 230 for a polymer melt extending between the first tool element 210 and the second tool element 220. A mixer structure 240 is arranged in the flow channel 230, which contains at least a first web element 241 and a second web element 242. The first web element 241 is arranged in an angle with respect to the second web element 242, whereby the angle between the first and second web element 241, 242 can be in a range of 25 degrees to 75 degrees. The first web element 241 and the second web element 242 can have at least a coupling element 248 for forming the mixer structure. The first web element 241 is in particular arranged cross-wise to the second web element 242. The coupling element 248 can be arranged in the crossing point or can form the crossing point of the web elements 241, 242. The mixer structure 240 comprises at least a base 245. The first web element 241 and the second web element 242 contain at least an end 243, 244, which is connected to the base 245. Alternatively, the base can be attached to the second tool element 220, what is not shown in the drawings.

A first and second fixing means 246 are provided by which the base 245 is releasably attached to the first element 210. The fixing means 246 can comprise a screw. The fixing means 246 can be manipulated from the interior of the tool element 210, 220.

The distance between the end 243 of the first web element 241 and the end 244 of the second web element 242 is smaller than the width B of the base 245. Each of the ends 243, 244 of the first and second web elements 241, 242 can be releasably or permanently connected the base 245. The mixer structure 240 is retained in the tool element 210 by a holding element 205. The holding element 205 according to this embodiment is configured as a recess 206, which is configured to receive the base 245.

The first and second tool element 210, 220 contain an inlet opening 234 and an outlet opening 235. The flow channel 230 is in particular disposed with a flow channel length FL, extends as the shortest possible connection line from the inlet opening 234 and the outlet opening 235. The flow channel 230 has a flow channel thickness FH, which corresponds to the normal distance between the first tool element 210 and the second tool element 220 as well as a flow channel width FB, which is arranged normally to the flow channel thickness FH and the flow channel length FL. The flow channel width FB is shown in one of FIG. 5, 6, 7.

The flow channel thickness FH in the outlet opening 235 is smaller than in the inlet opening 234. The outlet opening 235 forms a flat die. The inner surfaces of the first and/or second tool element 210, 220 can be parallel to each other, however, they can also be inclined with respect to each other. According to this embodiment, the inner surface of the tool element 210 has a section which is inclined with respect to the inner surface of the second tool element 220. A further section of the inner surface of the first tool element 210 is in parallel arrangement to the second tool element 220. The inner surface of the second tool element 220 forms at least in the area of the flow channel 230 a planar surface.

Figure 4:
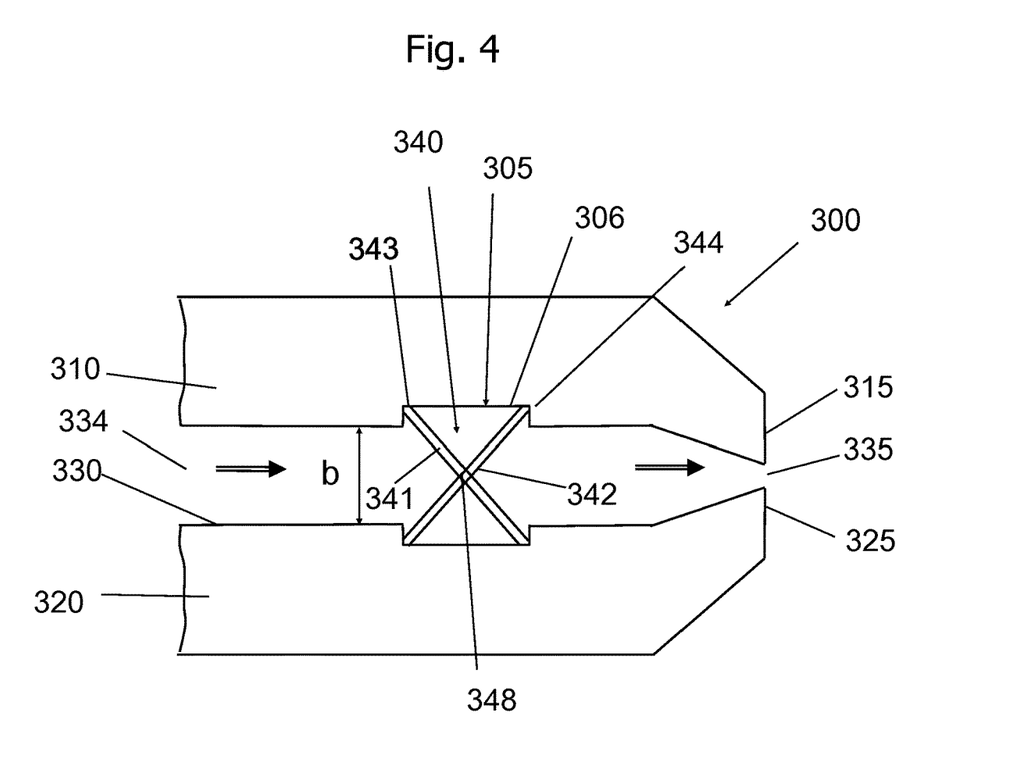
FIG. 4 a section through a film die according to a fourth embodiment.

FIG. 4 shows a section through a film die 300 according to a fourth embodiment, which differs from the film die according to FIG. 1 or FIG. 2 such that the mixer structure 340 is retained in a holding element 305, which is configured as a recess 306. A film die 300 according to the fourth embodiment of the invention contains a first tool element 310, a second tool element 320, a flow channel 330 for a polymer melt extending between the first tool element 310 and the second tool element 320. A mixer structure 340 is arranged in the flow channel 330, which contains at least a first web element 341 and a second web element 342. The first web element 341 is arranged in an angle with respect to the second web element 342, whereby the angle between the first and second web element 341, 342 can be in a range of 25 degrees to 75 degrees. The first web element 341 and the second web element 342 can have at least a coupling element 348 for forming the mixer structure 340. The first web element 341 is in particular arranged cross-wise to the second web element 342. The coupling element 348 can be arranged in the crossing point or can form the crossing point of the web elements 341, 342. The coupling element 348 can be arranged in the crossing point or can form the crossing point of the web elements 341,342. The crossing point divides each of the web elements 341, 342 in two web element sections, whereby the lengths of the legs of the web element sections of each of the web elements 341, 342 have the same length. The first web element 341 and the second web element 242 contain at least an end 343, 344, which is received in the corresponding recess 306. The recess 306 is configured as the holding element for this embodiment.

The distance between the end 343 of the first web element 341 and the end 344 of the second web element 342 is substantially the same as the width B of the recess 306. Each of the ends 343, 344 of the first and second web elements 341, 342 can be connected to one of the recesses 306. The mixer structure 340 is retained in at least one of the tool elements 310, 320 by a holding element 305. The holding element 305 according to this embodiment is configured as a recess 306, which is configured to receive the ends 343, 344 of the first and second web elements 341, 342.

The first and second tool element 310, 320 contain an inlet opening 334 and an outlet opening 335. The flow channel 330 is in particular disposed with a flow channel length FL, extends as the shortest possible connection line from the inlet opening 334 and the outlet opening 335. The flow channel 330 has a flow channel thickness FH, which corresponds to the normal distance between the first tool element 310 and the second tool element 320 as well as a flow channel width FB, which is arranged normally to the flow channel thickness FH and the flow channel length FL. The flow channel width FB is shown in one of FIG. 5, 6, 7.

The flow channel thickness FH in the outlet opening 335 is smaller than in the inlet opening 334. The outlet opening 335 forms a flat die. The inner surfaces of the first and/or second tool element 310, 320 can be parallel to each other, however, they can also be inclined with respect to each other.

Figure 5:
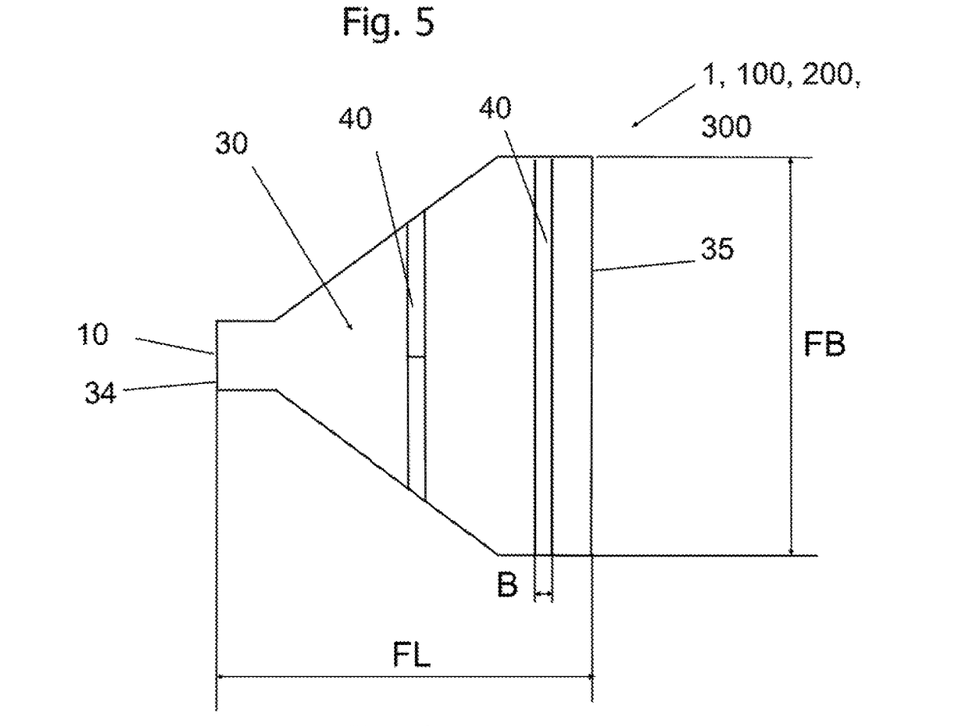
FIG. 5 a top view of a film die according to a first variant.

FIG. 5 shows a top view of a film die according to a first variant, whereby the film die can be configured according to one of the embodiments according to one of FIG. 1-4. The reference signs are chosen according to FIG. 1. The view of FIG. 5 shows only the contours of the flow channel 30. The tool element arranged around the flow channel, that means one of the tool elements 10, 20 is not shown in a simplification of this schematic view. The flow channel 30 extends from the inlet opening 34 to the outlet opening 35. FIG. 5 shows the flow channel length FL as well as the flow channel width FB in the section of the outlet opening. The flow channel width FB increases from the inlet opening 34 to the outlet opening 35. The increase of the flow channel width FB takes place in a flow channel section, in a further flow channel section the flow channel width FB is constant. In particular, the flow channel width FB is constant in a flow channel section immediately upstream of the outlet opening 35. Two mixer structures 40 are arranged in the flow channel flow channel 30. Each of the mixer structures 40 forms a ribbon. The mixer structure 40 in the increasing flow channel section consists of two ribbon segments. The mixer structure in the section of the flow channel of constant flow channel width consists of a single ribbon. Each of the mixer structures 40 can be configured as a ribbon or ribbon segment, independently of the mounting position in the tool element.

Figure 6:
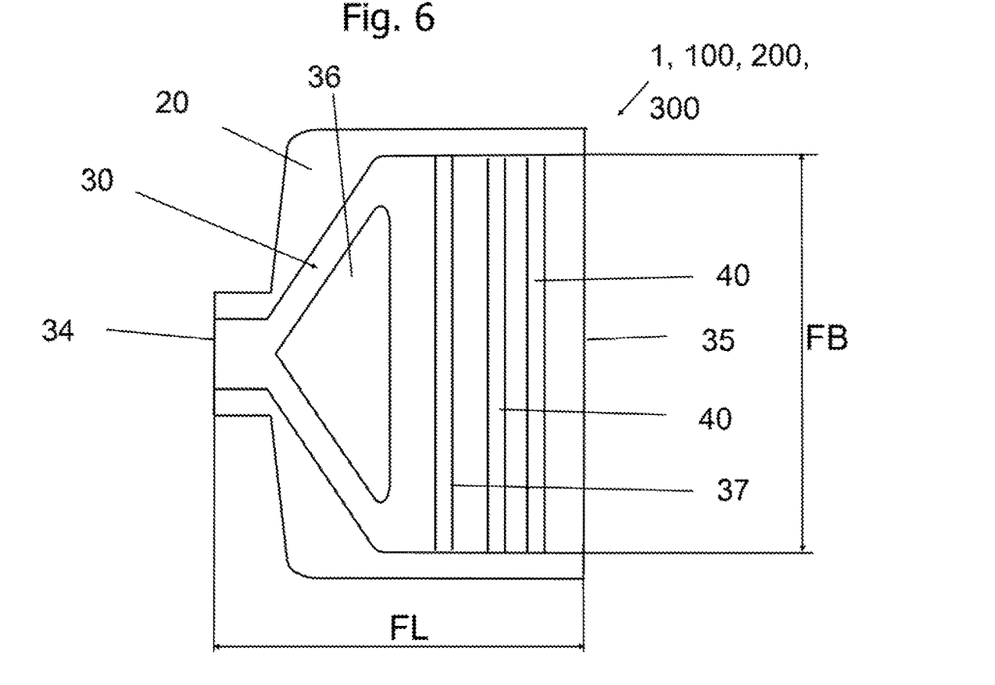
FIG. 6 a top view of a film die according to a second variant.

FIG. 6 shows a top view onto a film die according to a second variant, whereby the film die can be configured according to one of the embodiments according to one of FIG. 1-4. The reference signs are chosen corresponding to FIG. 1. The view of FIG. 6 shows the circumferences of the flow channel 30 as well as the tool element, which can be one of the tool elements 10, 20. In the same way as for the preceding embodiment, the flow channel width FB increases from the inlet opening 34 to the outlet opening 35. The flow channel width FB increases according to this embodiment over the smaller flow channel section. In order to distribute the polymer melt to the entire flow channel section, a guiding element is provided in the flow channel. In FIG. 6 at least two such guiding elements are shown exemplarily. One of these guiding elements is configured as an island array 36, a further guide element is configured as a flow obstructing bar 37. In addition, two mixer structures 40 are provided, which are arranged parallel to each other.

Figure 7:
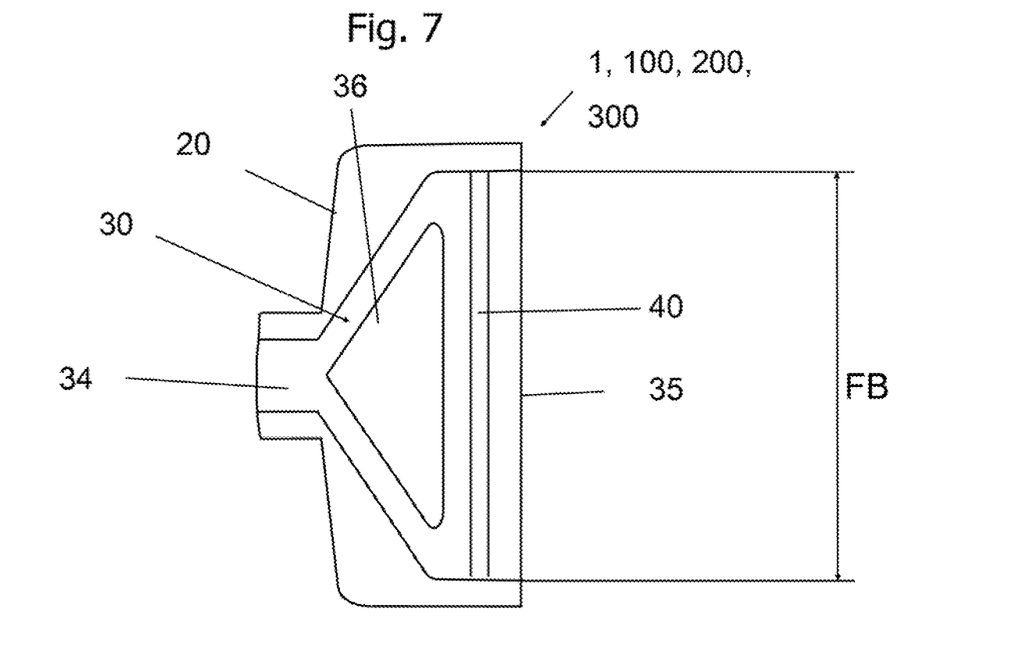
FIG. 7 a top view of a film die according to a third variant.

FIG. 7 shows a top view of a film die according to a third variant, whereby the film die can be configured according to one of the embodiments according to one of FIG. 1-4. The reference signs are chosen according to FIG. 1. The view of FIG. 7 shows the circumference of the flow channel 30 as well as the tool element, which is one of the tool elements 10, 20. In the same way as in the preceding embodiment, the flow channel width FB increases from the inlet opening 34 to the outlet opening 35. The flow channel width FB increases according to this embodiment over a smaller flow channel section than in the embodiment according to FIG. 5. In addition, the flow channel section of constant flow channel width FB is shorter than in FIG. 6. In order to distribute the polymer melt over the entire flow channel cross section, a guide element is provided in the flow channel, which is configured as an island array 36. A mixer structure 40 is provided in the flow channel section of constant flow channel width FB. The mixer structure 40 is configured as a ribbon which extends over the entire flow channel width FB. The ribbon has in particular a width (B) which corresponds to less than 10 times the flow channel thickness FH.

Figure 8:
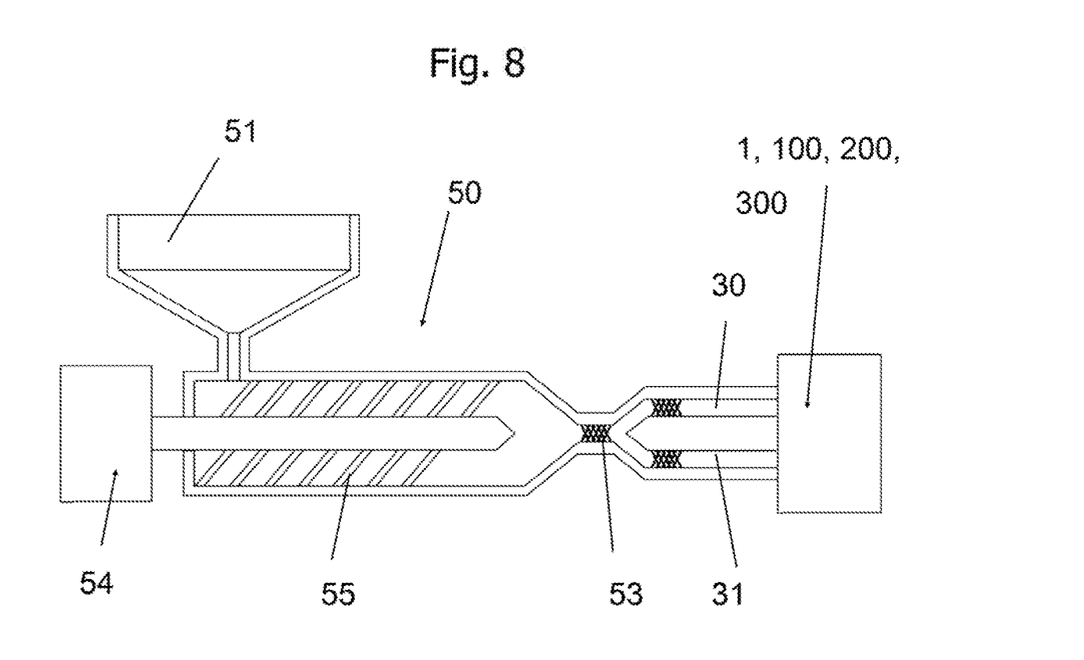
FIG. 8 an extruder comprising a film die.

The film die 1, 100, 200, 300 can be according to FIG. 8 a portion of an extruder 50 for manufacturing a polymer melt, in particular a foamable or foamed polymer melt. The extruder can comprise a hopper 51 for a polymer, an optional supply device for the introduction of a blowing agent in a polymer, a mixing device 53 for mixing of the polymer melt and optionally the blowing agent with the polymer melt as well as a film die 1 according to any of the preceding embodiments.

The extruder 50 has a screw element 55, which can be driven by a corresponding drive 54. The polymer can be added to the extruder by a hopper 51. If a supply device for a blowing agent is provided, this supply device is arranged downstream of the hopper 51. According to a variant not shown in the drawings, a first extruder, a second extruder and a connection element in the way of a transfer line can be provided, which connects the first extruder with the second extruder, which connects the first extruder with the second extruder. Each of the extruders can have the same configuration as the extruder 50 shown in FIG. 8.

A polymer melt containing a blowing agent is transformable at the discharge or in sequence to the film die 1, 100, 200, 300 into an at least partially foamed polymer melt.

The web elements according to any of the embodiments can be attributed to a first and a second web element group. The mixer structure can be configured as a static mixer. The mixer structure can comprise a first group of web elements and a second group of web elements. Each group can comprise a plurality of web elements. Depending on the width of the web elements. Depending on the width of the web elements and the flow channel width FB, 1 to 100 preferably 1 to 50 web elements can belong to a group. The web elements which belong to a group are characterized in that they are arranged parallel to each other. The lateral surfaces of the web elements directed in the direction of the impinging polymer melt form according to an embodiment a common plane.

The web elements of the first group are arranged crosswise to the web elements of the second group. A web element of the first group follows a web element of the second group according to this embodiment. The web element of the first group is thus arranged crosswise to the web element of the second group. The web elements of the first group change therefore with the web elements of the second group. The first and second groups can each form a plane, which is inclined with an angle of inclination of 25 to 75 degrees with respect to the inner surface of the tool element. In this view, the angle is in the range of 30 to 60 degrees, in many cases substantially 45 degrees.

The web elements are attached on their first end to the base 45, 145, 245 or are received in the recess 6, 106, 206, 306. At their second end, the web elements are also attached to a base 45, 145, 245 or are received in the recess 6, 106, 206, 306 or are lying on the surface of the corresponding tool element. Web elements can comprise one or more passages through which a heat exchange fluid can flow or which can be used as guiding means for a connecting means or a fixing means. The tool elements and/or the bases can contain a distribution passage for the distribution of a heat exchange fluid or a collecting passage for the collection of the heat exchange fluid from a plurality of discharge passages. A supply passage and a discharge passage can for instance be in fluid connection with the first and second end of the web element. For each of the web elements which contain channels, at least a supply channel is provided which is configured to supply the heat exchange fluid to the corresponding channel in the web element and a discharge channel which directs the heat exchange fluid from the channel in the web element into a collecting channel. The heat exchange fluid is supplied and/or discharged in this case through the base and/or the tool element.

The passages in the web elements can have oval or circular cross-section. The passages can also have different cross-sectional shapes, for instance a triangular, rectangular or polygonal cross-sectional surface.

Alternatively or in addition to the preceding embodiments, the film die (1, 100, 200, 300) can comprise a first tool element (10, 110, 210, 310), a second tool element (20, 120, 220, 320), a flow channel (30, 130, 230, 330) extending between the first tool element (10, 110, 210, 310) and the second tool element (20, 120, 220, 320) for a polymer melt, whereby the first and/or the second tool element (10, 20, 110, 120, 210, 220, 310, 320) comprise an inlet opening (34, 134, 234, 334) and an outlet opening (35, 135, 235, 335), whereby the flow channel (30, 130, 230, 330) has a flow channel length FL, whereby the flow channel (30, 130, 230, 330) has a flow channel thickness FH, which is configured as the normal distance between the first tool element (10, 110, 210, 310) and the second tool element (20, 120, 220, 320), and a flow channel width FB, which is disposed normally with respect to the flow channel thickness FH and the flow channel length FL, whereby the flow channel width FB increases from the inlet opening (34, 134, 234, 334) to the outlet opening (35, 135, 235, 335) at least sectionally, such that the flow channel width FB at the outlet opening (35, 135, 235, 335) is greater than at the inlet opening (34, 134, 234, 334), whereby the flow channel width FB upstream of the outlet opening (35, 135, 235, 335) is constant in a flow channel section, whereby a mixer structure (40, 140, 240, 340) is arranged in the flow channel section of constant flow channel width FB.

In particular, a guiding element (36, 37) can be arranged in the flow channel. The guiding element can be configured as an island array (36). The guiding element (36, 37) is arranged upstream of the mixer structure (40,140, 240, 340).

The mixer structure (40, 140, 240, 340) can extend across the flow channel width FB. The mixer structure (40, 140, 240, 340) can comprise a ribbon or a ribbon segment. The ribbon can have a width, which corresponds to less than 10 times the flow channel thickness FH.

The mixer structure (40,140, 240) can comprise at least a base (45, 145, 245) whereby the base (45, 145, 245) is attached to at least one of the first and second tool elements (10, 20, 110, 120, 210, 220).

The mixer structure can be disposed with a mixer structure projection surface, whereby the base (45, 145, 245) is disposed with a base projection surface, whereby the mixer structure projection surface and the base projection surface are arranged normally to the flow channel thickness FH, whereby the base projection surface is not greater than 10 times of the mixer structure projection surface.

The mixer structure can comprise at least a first web element (41, 141, 241, 341) and a second web element (42, 142, 242, 342), whereby the first web element (41, 141, 241, 341) can be arranged crosswise to the second web element (42, 142, 242, 342). At least one of the first web elements (41, 141, 241) and the second web elements (42, 142, 242) can comprise at least an end (43, 44, 143, 144, 243, 244) which is connected to the base (45, 145, 245).

The mixer structure can be received in at least one of the tool elements (10, 20, 110, 120, 210, 220, 310, 320) by a holding element (5, 105, 205, 305). The holding element (5, 105, 205, 305) can comprise a recess (6, 106, 206, 306). The base (45, 145, 245) can be received in the holding element (5, 105, 205) or can be configured as a holding element (5, 105, 205).

The base can comprise a fixing means (46, 146, 246) for connection with one of the tool elements (10, 20, 110, 120, 210, 220).

It should be apparent to those skilled in the art that many more modifications besides those already described are possible without departing from the inventive concepts herein. The inventive subject matter, therefore, is not to be restricted by the preceding description except in the scope of the appended claims. Moreover, in interpreting both the specification and the claims, all terms should be interpreted in the broadest possible manner consistent with the context of the claims. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the claims refer to at least one of an element or compound selected from the group consisting of A, B, C . . . and N, the text should be interpreted as requiring only one element from the group, not A plus N, or B plus N, or any other combination of two or more elements or components of this group.

What is claimed is:

1. A film die comprising a first tool element, a second tool element, a flow channel for a polymer melt flowing from an inlet opening to an outlet opening of the flow channel thereby defining a direction of fluid flow, wherein the flow channel extends between the first tool element and the second tool element, whereby a mixer structure is arranged in the flow channel, whereby the mixer structure comprises a base, a first web element and a second web element, whereby the mixer structure is held in at least one of the tool elements by at least one holding element, whereby a length of a projection of the mixer structure in the direction of fluid flow is greater or substantially equal to a width of the holding element measured in the direction of fluid flow, whereby at least one of the first web element or the second web element comprises at least an end which is connected to the base configured to be received in an inner wall of the film die, and whereby at least one of the first web element or the second web element is received at least partially in the base.

2. The film die of claim 1, whereby the base is attached to at least one of the first tool element or the second tool element.

3. The film die of claim 1, whereby the base is received in the holding element or is configured as the holding element.

4. The film die of claim 1, whereby the first web element is arranged crosswise to the second web element.

5. The film die of claim 1, whereby the mixer structure comprises a ribbon or a ribbon segment, whereby the ribbon can have a width which corresponds to less than ten times of a flow channel thickness.

6. The film die of claim 1, whereby the first tool element and the second tool element comprise the inlet opening and the outlet opening whereby the flow channel has a flow channel length which extends from the inlet opening to the outlet opening as a shortest connection line, whereby the flow channel has a flow channel thickness which is configured as a normal distance of the first tool element to the second tool element, as well as a flow channel width which extends in a normal direction with respect to the flow channel thickness and the flow channel length.

7. The film die of claim 6, whereby the flow channel width at the outlet opening is greater than the flow channel width at the inlet opening.

8. The film die of claim 6, whereby the mixer structure extends over the flow channel width.

9. The film die of claim 1, whereby the base comprises a screw connection for connection with one of the first tool element or the second tool element.

* * * * *